United States Patent
Tanaka et al.

(10) Patent No.: US 6,892,928 B2
(45) Date of Patent: May 17, 2005

(54) METHOD OF MANUFACTURING TUBULAR BODY, BY FRICTION STIR WELDING

(75) Inventors: Sunao Tanaka, Nagoya (JP); Masaki Kumagai, Nagoya (JP)

(73) Assignee: Sumitomo Light Metal Industries, Ltd., Minato-Ku (JP)

( * ) Notice: Subject to any disclaimer, the term of this patent is extended or adjusted under 35 U.S.C. 154(b) by 72 days.

(21) Appl. No.: 10/653,565

(22) Filed: Sep. 2, 2003

(65) Prior Publication Data

US 2004/0041005 A1 Mar. 4, 2004

(51) Int. Cl.[7] .................. B23K 20/12; B23K 31/02; B21D 39/00
(52) U.S. Cl. .................. 228/114; 228/151; 228/173.2; 228/112.1; 72/51
(58) Field of Search ................. 228/112.1, 114, 228/141.1–174; 72/48, 51, 52

(56) References Cited

U.S. PATENT DOCUMENTS

| | | | |
|---|---|---|---|
| 1,458,604 A | * 6/1923 | Woodward | 228/151 |
| 4,122,696 A | * 10/1978 | Midzutani et al. | 75/52 |
| 5,460,317 A | 10/1995 | Thomas et al. | |
| 5,813,592 A | * 9/1998 | Midling et al. | 228/112.1 |
| 6,050,474 A | * 4/2000 | Aota et al. | 228/112.1 |
| 6,068,178 A | * 5/2000 | Michisaka | 228/112.1 |
| 6,237,829 B1 | * 5/2001 | Aota et al. | 228/2.1 |
| 6,290,117 B1 | * 9/2001 | Kawasaki et al. | 228/112.1 |
| 6,305,866 B1 | * 10/2001 | Aota et al. | 228/112.1 |
| 6,325,273 B1 | * 12/2001 | Boon et al. | 228/112.1 |
| 6,378,754 B2 | * 4/2002 | Aota et al. | 228/112.1 |
| 6,585,147 B2 | * 7/2003 | Jogan | 228/112.1 |
| 6,708,865 B2 | * 3/2004 | Yoshinaga | 228/112.1 |
| 6,722,286 B2 | * 4/2004 | Okamura et al. | 105/396 |

FOREIGN PATENT DOCUMENTS

| | | |
|---|---|---|
| JP | 2000-142003 A | 5/2000 |
| JP | 2000-263294 A | 9/2000 |
| JP | 2001-88504 A | 4/2001 |

* cited by examiner

*Primary Examiner*—Colleen P. Cooke
(74) *Attorney, Agent, or Firm*—Burr & Brown

(57) ABSTRACT

Method of manufacturing a tubular end product, wherein an aluminum plate is formed into a generally cylindrical body such that opposite end sections of the cylindrical body are flattened and butted together along a joint region extending parallel to an axis of the cylindrical body, and such that each of the opposite flattened end sections has a predetermined width L as measured normal to the joint region, and the opposite flattened end sections are joined together at the joint region, by a friction stir butt welding operation wherein a rotary tool having a circular shoulder surface and a probe extending from the shoulder surface is moved relative to the cylindrical body while the shoulder surface is in rubbing contact with the flattened end sections, with the probe being rotated with the rotary tool and inserted in the joint region. The width L of each flattened end section of the cylindrical body is determined so as to be not smaller than a radius r (mm) of the rotary tool when $2r/\sin\theta < R$, and not smaller than the radius r plus 3 mm when $2r/\sin\theta \geq R$, wherein "$\theta$" and "R" respectively represent an angle (°) of inclination of an axis of rotation of the rotary tool with respect to a normal to the surface of the joint region, and an outside radius (mm) of the desired tubular product.

4 Claims, 2 Drawing Sheets

METHOD OF MANUFACTURING TUBULAR BODY, BY FRICTION STIR WELDING

This application is based on Japanese Patent Application No. 2001-290747 filed on Sep. 25, 2001, the contents of which are incorporated hereinto by reference.

BACKGROUND OF THE INVENTION

1. Field of the Invention

The present invention relates in general to a method of friction stir welding, and more particularly to a method of friction stir welding suitably applicable to an operation of joining together two end sections of a generally cylindrical body which is formed from an aluminum plate such that the two end sections are butted together along a joint region or line. The generally cylindrical body the end sections of which have been jointed together by friction stir welding is subsequently subjected to a forming operation such as a roll forming process, to provide a desired tubular end product such as a wheel for automobiles, or a tubular product which is required to exhibit a sufficiently high strength or resistance at its weld region to internal pressure.

2. Discussion of Related Art

In the art of manufacturing a tubular product which has a relatively large diameter and a relatively small cylindrical wall thickness and which is considered difficult to be formed by extrusion as an integral body, there have been employed various methods wherein a starting workpiece in the form of a plate or sheet is formed into a tubular body by roll forming, and the end sections of the formed tubular body are butted and urged together along a joint line parallel to an axis of the tubular body, and are joined together by a suitable butt welding process such as MIG welding (metal inert-gas welding), TIG welding (tungsten inert-gas welding), flash butt welding, or DC butt welding. Such a butt welding process involves melting of the material, and is a sort of fusion welding process, which tends to suffer from occurrence of defects at the weld region under some welding conditions, giving rise to a risk of significant reduction in the yield ratio of the product.

Recently, an increasing attention has been drawn to a friction stir welding process which is a sort of solid-phase welding process and which involves a relatively small amount of heat generation in the workpiece, a relatively small amount of strength reduction in the weld region and a relatively small amount of residual strain in the weld region. The application of this friction stir welding has already been employed for butt welding in the manufacture of a tubular body for a rim of an automotive wheel. In the friction stir welding operation in general, two workpieces to be joined together are butted together along a joint line or region, and a rotary tool or wheel provided with a probe or pin extending from its shoulder surface (bottom end face) is rotated and moved or translated relative to the workpieces, while the shoulder surface is held in rubbing contact with the surface of the joint region, with the probe being rotated with the rotary tool and inserted in the joint region, so that frictional heat is generated to plasticise the material at the joint region while causing plasticised segments of the joint region to be interlocked with each other, as a result of a stirring action of the probe rotating at a high speed, whereby the two workpieces are joined together without melting of the material.

Where the friction stir butt welding is practiced on a joint region defined by the butted adjacent surfaces of a tubular or cylindrical body, the shoulder surface of the probe or pin of the rotary tool is held in a rubbing contact with a part-cylindrical surface at and near the joint region, such that the depth of undercut of the shoulder surface into the material is relatively large at a radially central portion of the shoulder surface near the probe inserted in the joint region, and is relatively small at a radially outer portion of the shoulder surface. Accordingly, the plasticised material is likely to be expelled or driven from a local area of the joint region corresponding to the radially central portion of the shoulder surface of the rotary tool, toward a local area corresponding to the radially outer portion of the shoulder surface, so that the weld region obtained along the joint line tends to be recessed at a central portion thereof corresponding to the radially central portion of the shoulder surface, so as to form an undesirable cavity extending in the direction of the relative movement between the rotary tool and the tubular body. The formation of the cavity in the weld region causes reduction in the mechanical strength of the welded tubular body. In this respect, the friction stir butting welding process has been considered inappropriate for butt welding in the manufacture of a generally tubular product such as a wheel for an automobile.

In view of the drawback experienced in the friction stir butt welding process described above, there have been proposed methods of manufacturing a two-piece aluminum alloy wheel for an automobile, as disclosed in JP-A-2001-88504. In the method disclosed in this publication, an aluminum alloy plate is formed into a generally cylindrical formed body, and the opposite end sections of the formed body are flattened before these flattened end sections are butted together along a joint line or region and then joined together by flash butt welding or friction stir butt welding. Subsequently, the flattened end sections jointed together along the joint line are re-shaped into a part-cylindrical shape, so that the thus obtained cylindrical body is used as a desired aluminum alloy wheel. JP-A-2000-142003 discloses a method of manufacturing an aluminum wheel for an automobile, wherein two workpieces in the form of two semi-cylindrical halves are machined at their end faces and are butted together at the machined end faces and then joined together into a truly cylindrical body of aluminum, by electron beam welding, laser welding, friction stir welding or any other welding process which involves a relatively small amount of heat generation.

While the publications identified above disclose the application of various welding techniques, a primary concern as described in those publications is the application of the electron beam welding and flash butt welding, and the application of the friction stir welding technique is merely referred to in the publications. Namely, the publications do not disclose the details on the conditions in which the friction stir welding process is performed, for example, the specific width dimension of each of the opposite flattened end sections of the generally cylindrical body, which width dimension permits the end product to have a high-quality weld region.

Where the friction stir welding operation is performed on a cylindrical body, it will be generally understood that the required width of the flattened end sections of the cylindrical body is sufficiently larger than the diameter of the rotary tool or wheel used. For increased efficiency of manufacture of the cylindrical end product, however, it is desirable to minimize the width dimension of the flattened end sections prior to the application of the friction stir welding, in view of a need of re-shaping the flattened end sections after their joining, into a truly cylindrical body as the end product. On the other hand, it will also be understood that the width dimension of the flattened end sections cannot be made to the diameter of the rotary tool, for all combinations of the specifications of the rotary tool and tubular body and the friction stir welding condition, in order to minimize the amount of generation of flash in a portion of the joint region corresponding to the leading outer edge portion of the shoulder surface of the rotary tool, irrespective of the diameter of the tubular body and the depth of undercut of the shoulder surface into the material of the joint region.

SUMMARY OF THE INVENTION

The present invention was made in view of the background art discussed above. It is an object of the present invention to provide a method of manufacturing a desired tubular body with a high quality, by forming an aluminum plate into a generally cylindrical body, and joining together the opposite end sections of the generally tubular body along a joint region, by a friction stir butt welding operation, without a defect in a weld region of the manufactured desired tubular body.

The object indicated above may be achieved according to the principle of the present invention, which provides a method of manufacturing a desired tubular body, comprising a step of forming an aluminum plate into a generally cylindrical body such that opposite end sections of the generally cylindrical body are flattened and butted together along a joint region extending along a joint line parallel to an axis of the generally cylindrical body, and such that each of the opposite flattened end sections has a predetermined width dimension L as measured in a direction perpendicular to the joint line, and a step of joining together the opposite flattened end sections at the joint region, by a friction stir butt welding operation wherein a rotary tool having a circular shoulder surface at a bottom end thereof and a probe coaxial with and extending from the shoulder surface is moved relative to the generally cylindrical body while the shoulder surface is in rubbing contact with outer surfaces of the opposite flattened end sections, with the probe being rotated with the rotary tool and inserted in the joint region, the method further comprising a step of:

determining the width dimension L of each of the opposite flattened end sections of the generally cylindrical body, so as to satisfy a first formula, $L \geq r$ when $2r/\sin \theta < R$, and a second formula, $L \geq r+3$ when $2r/\sin \theta \geq R$, wherein "r", "θ" and "R" respectively represent a radius (mm) of the rotary tool, an angle (°) of inclination of an axis of rotation of the rotary tool with respect to a normal to the surface of the joint region, and an outside radius (mm) of the desired tubular body.

In one preferred form of the invention, the method further comprises a step of re-shaping the opposite flattened end sections of the generally cylindrical body into a part-cylindrical shape, after the friction stir butt welding operation.

The step of re-shaping the opposite flattened end sections is preferably effected by subjecting the opposite flattened end sections to a roll forming operation.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENT

The aluminum plate which is formed into a generally cylindrical body to be subjected to a friction stir butt welding operation according to the present invention may be an ordinary aluminum or aluminum alloy plate or sheet having a specific geometry, which is selected depending upon the application of a generally tubular end product. Typical examples of an aluminum alloy for the aluminum alloy plate are: Al—Cu alloys (JIS 2000 series alloys); Al—Mg alloys (JIS 5000 series alloys); Al—Mg—Si alloys (JIS 6000 series alloys); and Al—Zn—Mg alloys (JIS 7000 series alloys). The aluminum plate may be a rolled or cast plate, having the length, width and thickness dimensions determined by the dimensions of the generally tubular end product, and may be subjected to heat treatment and any other working processes as needed.

Figure 1:
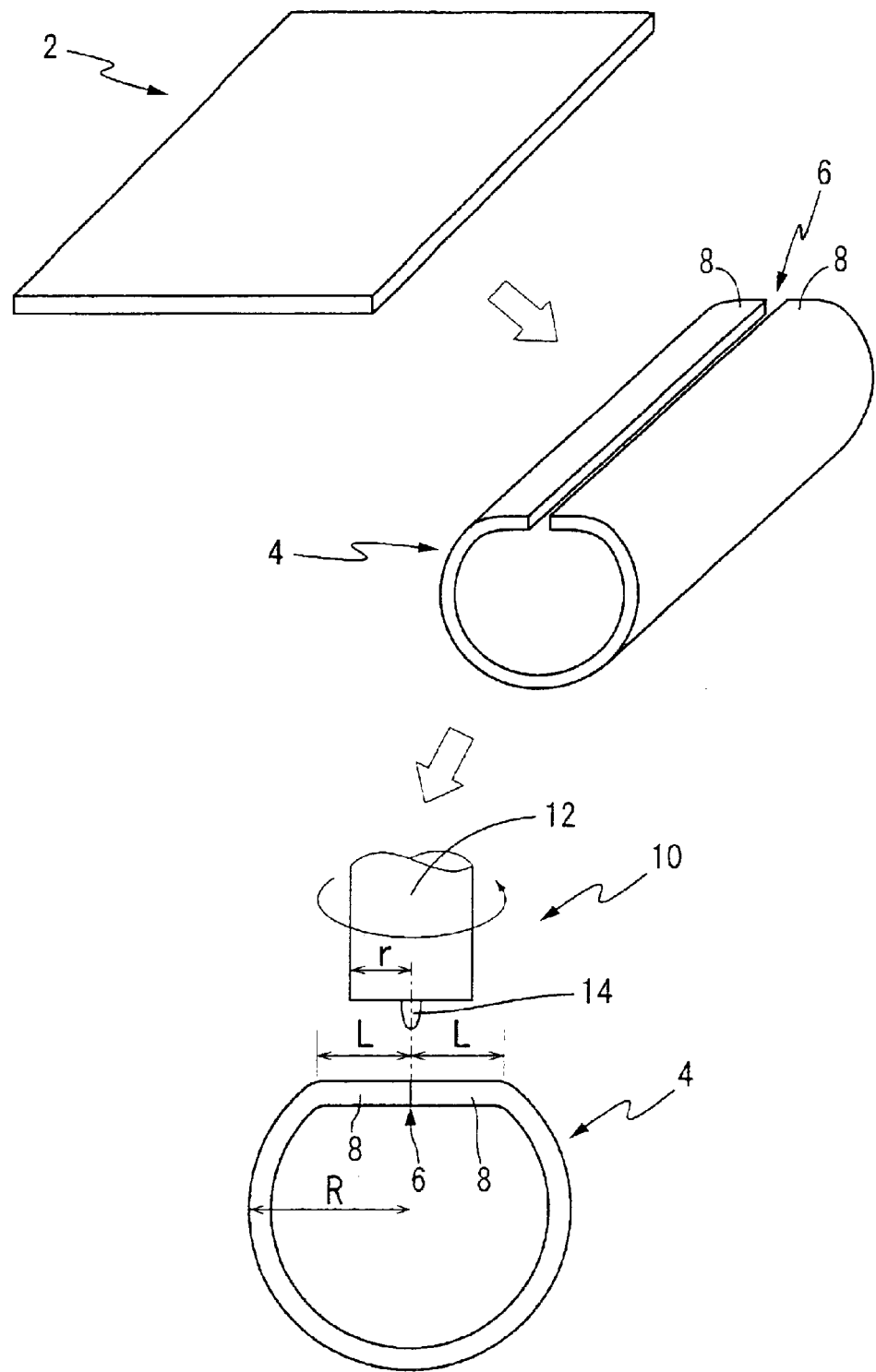
FIG. 1 is a view illustrating process steps of forming an aluminum plate into a generally cylindrical body, and joining together the opposite end sections of the generally cylindrical body by a friction stir butt welding operation, to manufacture a desired tubular body.

To manufacture a desired tubular end product by using the aluminum plate or sheet having the predetermined dimensions as indicated at 2 in FIG. 1, the aluminum plate 2 is formed into a generally cylindrical body 4, by a roll forming process or any other known forming process, such that the opposite end sections of the generally cylindrical body 4 are flattened and butted together along a joint region 6 extending along a joint line which is parallel to an axis of the generally cylindrical body 4, and such that each of the opposite flattened end sections 8, 8 has a predetermined width dimension L as measured in a direction perpendicular to the axis of the generally cylindrical body 4, as indicated in FIG. 1. Namely, the generally cylindrical body 4 is cylindrical except at the opposite flattened end sections 8 which are butted together so as to define a joint region 6 (joint line) therebetween. The flattened end sections 8 may be formed by any known flattening process, which may be performed concurrently with the process of forming the aluminum plate 2 into a cylindrical body, so as to form the generally cylindrical body 4, or alternatively performed on the already formed cylindrical body, so as to form the generally cylindrical body 4.

Figure 2:
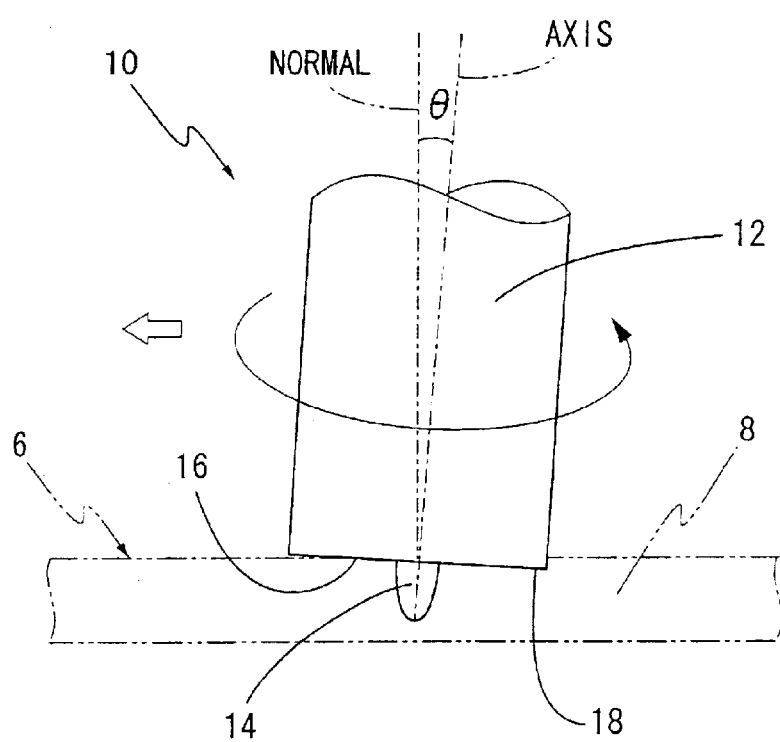
FIG. 2 is a view showing an attitude of a rotary tool relative to a joint region of the generally cylindrical body, in the process of the friction stir butt welding operation.
Figure 3:
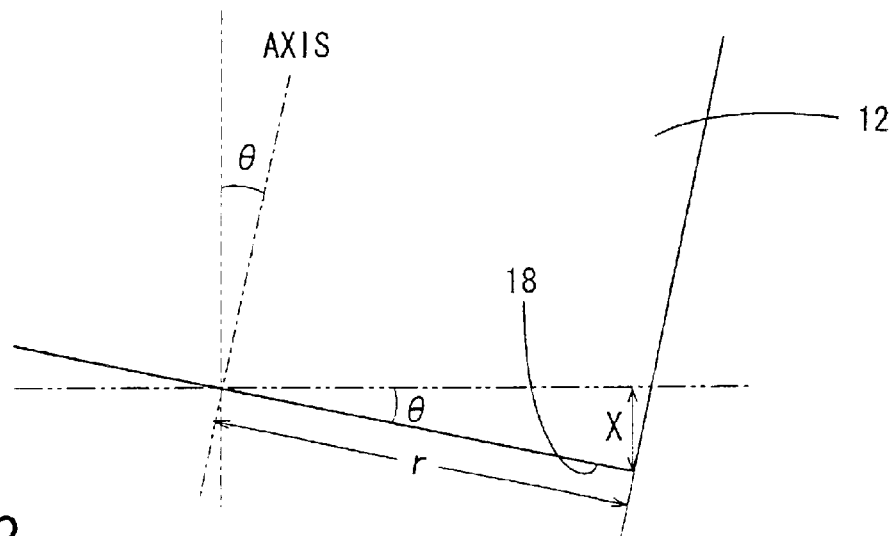
FIG. 3 is a view for explaining a depth X of undercut of the shoulder surface of the rotary tool into the material of the joint region, in relation to a radius r of the rotary tool and an angle of inclination of the axis of the rotary tool with respect to the normal to the surface of the joint region.

Then, the generally cylindrical body 4 having the opposite flattened end sections 8, 8 is subjected, at its joint region 6, to a friction stir butt welding operation according to the principle of the present invention, for manufacturing the desired end product in the form of a tubular body. The friction stir butt welding operation is performed by using a rotary tool or wheel 10 which includes a cylindrical body 12 as shown in FIGS. 1 and 2. The rotary tool 10 is rotated by a suitable drive source. The cylindrical body 12 has a circular shoulder surface 16 at its bottom or lower end, and a probe or pin 14 integrally formed on the shoulder surface 16 such that the probe 14 is coaxial with and extends from the circular shoulder surface 16, as shown in FIG. 2. To join together the flattened end sections 8, 8 of the generally cylindrical body 4 along the joint region 6, the thus constructed rotary tool 10 is moved or translated relative to the generally cylindrical body 4 at a suitable speed, while the shoulder surface 16 is held in rubbing contact with the outer surfaces of the flattened end sections 8, with the probe 14 being rotated with the cylindrical body 12 and inserted in the joint region 6. As the rotating rotary tool 10 is thus moved relative to the generally cylindrical body 4, frictional heat is generated due to a rubbing contact between the shoulder surface 16 and the outer surfaces of the opposite flattened end sections 8, and a rubbing contact between the circumferential surface of the probe 14 and the adjacent opposite end faces of the flattened end sections 8 which define the joint region 6. As a result of generation of the frictional heat, the material in the joint region 6 and in the vicinity of the joint region 6 is plasticised, and the plasticised segments of the opposite flattened end sections 8 are physically interlocked with each other under a stirring action of the probe 14 which is rotated at a high speed, so that the opposite flattened end sections 8 are jointed together along the joint region 6 while the rotary tool 10 is moved relative to the generally cylindrical body 4 such that the probe 14 and the shoulder surface 16 are held in rubbing contact with the surfaces defining the joint region 6. As indicated in FIG. 2, the rotary tool 10 is moved while the axis of rotation of the rotary tool 10 is held inclined at a predetermined angle θ with respect to a line normal to the surface of the joint region 6, in the direction opposite to the direction of movement of the rotary tool 10 indicated by an arrow in FIG. 2. This inclination of the axis of rotation of the rotary tool 10 toward its trailing side causes the circular shoulder surface 16 to have a certain amount of undercut X into the joint region 6, at a trailing outer edge portion 18 of the shoulder surface 16, as shown in FIGS. 2 and 3.

The present inventors had the following finding in connection with the drawbacks experienced in the conventional friction stir welding process previously described. Namely, the undercut depth X at the trailing outer edge portion 18 of the circular shoulder surface 18 of the rotary tool 10 is represented by a product (r×sin θ) of a radius r (mm) of the rotary tool 10 (cylindrical body 12) and the inclination angle θ (°) of the axis of rotation of the rotary tool 10, as is apparent from the enlarged view in FIG. 3. The inventors empirically found that one half of the undercut depth X of the shoulder surface 16 has some influence on the state of generation of flash in the friction stir butt welding process. An experimentation repeatedly conducted by the inventors revealed that the workpiece (generally cylindrical body 4) subjected to the friction stir butt welding operation is free from the drawbacks described above, when the width dimension L of each flattened end section 8 of the generally cylindrical body 4 is determined on the basis of a relationship among values X/2, $r^2$ and R, as described below. "R" represents an outside radius (mm) of the generally cylindrical body 4 (a radius of the desired tubular end product). Described more specifically, the friction stir butt welding of the opposite flattened end sections 8, 8 can be performed without the drawbacks such as the formation of an elongate cavity or recess in a weld region corresponding to the joint region 6 subjected to the friction stir butt welding operation, where the width dimension L of each of the opposite flattened end sections 8 of the generally cylindrical body 4 is determined, so as to satisfy a first formula, $L \geq r$ when $2r/\sin \theta < R$, and a second formula $L \geq r+3$ when $2r/\sin \theta \geq R$. In other words, the determination of the width dimension L as described above permits the friction stir butt welding operation to provide a sound weld or joint at the joint region 6, so that the manufactured tubular end product has a sufficiently high strength and a reduced amount of strain at the weld region corresponding to the joint region 6.

Where $(X/2) \geq (r^2/R)$, that is, where $2r/\sin \theta < R$, the radius R of the generally cylindrical body 4 (tubular end product) is sufficiently large with respect to the undercut depth X at the trailing outer edge portion 18 of the shoulder surface 16 of the rotary tool 10, so that the width dimension L of the flattened end sections 8 may be equal to or larger than the radius r of the rotary tool 10. That is, the amount of generation of flash can be reduced, and the obtained weld region can be sound without a defect, even if the radius R is equal to the radius r, since the radius R is sufficiently large. Where $(X/2) < (r^2/R)$, that is, where $2r/\sin \theta \geq R$, on the other hand, the radius R of the generally cylindrical body 4 is not considered to be sufficiently large with respect to the undercut depth X, the width dimension L must be equal to or larger than (r+3) mm. The amount of generation of flash can be reduced, and the obtained weld region can be sound without a defect, if the width dimension L of each flattened end section 8 is larger by at least 3 mm than the radius r of the rotary tool 10, that is, if a sum of the width dimensions L of the opposite flattened end sections 8 is larger by at least 6 mm than the diameter 2r of the rotary tool 10. The upper limit of the width dimension L is suitably determined depending upon the formability or ease of formation of the generally cylindrical body 4, and ease of re-shaping of the flattened end sections 8 after the welding. Generally, the upper limit is not larger than R×sin45°.

The flattened end sections 8 of the generally cylindrical body 4 which have been joined together by the friction stir butt welding operation are re-shaped into a part-cylindrical shape, by a suitable forming or shaping method such as a roll forming technique, so that a truly cylindrical body is obtained as the desired tubular end product having an intended quality.

EXAMPLES

To further clarify the present invention, there will be described some examples of a friction stir butt welding operation to manufacture cylindrical bodies from generally cylindrical bodies having respective different width dimensions L. It is to be understood that the present invention is not limited to the details of the examples, but may be embodied with various changes, modifications and improvements, which may occur to those skilled in the art, without departing from the spirit and scope of the invention defined in the appended claims.

Initially, six pieces of an aluminum plate having a thickness of 2.5 mm and a width of 315 mm and having a composition according to JIS-A-5454P were prepared, and formed into generally cylindrical bodies having respective width dimensions L of each of the opposite flattened end sections as indicated in TABLE 1 given below. Each piece was formed by roll forming technique into the generally cylindrical body having an outside radius R of 220 mm or 250 mm. Each of the thus formed generally cylindrical bodies was set and positioned by a clamping jig of a friction stir butt welding device. As a backing jig, a flat bar of a soft steel material having a width of 10 mm, a length of 400 mm and a thickness of 30 mm was used. Each generally cylindrical body was set such that the joint region was located above the backing jig. To prevent the joint region from being opened upon insertion of the probe of the rotary tool, the generally cylindrical body was clamped by vises such that the end faces of the opposite flattened end sections are held in abutting contact with each other.

To perform the friction stir butt welding operation on each of the generally cylindrical bodies thus set in the welding device, there was used the rotary tool wherein the cylindrical body or circular shoulder surface has a radius r of 6 mm and the probe has a diameter of 3 mm and an axial dimension of 2.3 mm. In the friction stir butt welding operation, the rotary tool was rotated at 2000 r.p.m., and was moved at a speed of 500 mm/min., relative to the joint region, with an inclination angle θ of 3° of the axis of rotation. The generally cylindrical bodies according to six samples 1–6 were evaluated of the quality of their weld regions obtained by the friction stir butt welding along the joint region. A result of the evaluation of each sample is indicated in TABLE 1 in which "OK" means that the weld region is acceptable, and "NG" means that the weld region is not acceptable (namely, defective).

TABLE 1

| Samples No. | θ(°) | r (mm) | 2r/sinθ | R (mm) | L (mm) | Evaluation |
|---|---|---|---|---|---|---|
| 1 | 3 | 6 | 229 | 220 | 6 | NG |
| 2 | 3 | 6 | 229 | 220 | 8 | NG |
| 3 | 3 | 6 | 229 | 220 | 9 | OK |
| 4 | 3 | 6 | 229 | 220 | 12 | OK |
| 5 | 3 | 6 | 229 | 250 | 5 | NG |
| 6 | 3 | 6 | 229 | 250 | 6 | OK |

The generally cylindrical bodies according to Sample Nos. 3, 4 and 6 wherein the width dimension L of each flattened end section was determined according to the principle of the present invention as indicated in TABLE 1 did not suffer from opening at the weld region (displacement of the opposite flattened sections away from each other) even after the clamping force applied to hold these end sections in abutting contact with each other was released, and had a sound weld region without an elongate cavity or recess in the weld region. On the other hand, the generally cylindrical bodies according to Sample Nos. 1, 2 and 5 wherein the width dimension L was not determined according to the principle of this invention had a poor weld region with an elongate cavity, although they did not suffer from opening at the weld region.

The generally cylindrical bodies according to Sample Nos. 3, 4 and 6, which were subjected to the friction stir butt welding operations, are re-shaped at their flattened end sections so that the end sections cooperate to form a part-cylindrical shape. The re-shaped cylindrical bodies did not suffer from any cracking at the weld regions, and were highly evaluated to be usable as a rim of an aluminum wheel for a motor vehicle.

It will be understood from the foregoing description that a desired tubular body with a sound weld having a sufficiently high strength and without an elongate cavity in the weld region and a residual strain can be manufactured by forming an aluminum plate into a generally cylindrical body and by joining together the opposite flattened end sections along the joint region of the formed generally cylindrical body by a friction stir butt welding operation according to the present invention. The generally cylindrical body having the opposite flattened end sections thus joined together can be re-shaped into the desired cylindrical end product, without any defect at the weld region due to the re-shaping of the flattened end sections. Accordingly, the tubular end product thus manufactured by the method of the present invention can be suitably used as a rim of an aluminum wheel for automobiles.

What is claimed is:

1. A method of manufacturing a desired tubular body, comprising a step of forming an aluminum plate into a generally cylindrical body such that opposite end sections of the generally cylindrical body are flattened and butted together along a joint region extending along a joint line parallel to an axis of the generally cylindrical body, and such that each of the opposite flattened end sections has a predetermined width dimension L as measured in a direction perpendicular to said joint line, and a step of joining together said opposite flattened end sections at said joint region, by a friction stir butt welding operation wherein a rotary tool having a circular shoulder surface at a bottom end thereof and a probe coaxial with and extending from said shoulder surface is moved relative to said generally cylindrical body while said shoulder surface is in rubbing contact with outer surfaces of said opposite flattened end sections, with said probe being rotated with said rotary tool and inserted in said joint region, said method further comprising a step of:

determining said width dimension L of each of said opposite flattened end sections of said generally cylindrical body, so as to satisfy a first formula, L≧r when 2r/sin θ<R, and a second formula, L≧r+3 when 2r/sin θ≧R, wherein "r", "θ" and "R" respectively represent a radius (mm) of said rotary tool, an angle (°) of inclination of an axis of rotation of said rotary tool with respect to a normal to said surface of said joint region, and an outside radius (mm) of said desired tubular body.

2. The method according to claim 1, further comprising a step of re-shaping said opposite flattened end sections of said generally cylindrical body into a part-cylindrical shape, after said friction stir butt welding operation.

3. The method according to claim 2, wherein said step of re-shaping said opposite flattened end sections is effected by subjecting said opposite flattened end sections to a roll forming operation.

4. The method according to claim 1, wherein said aluminum plate is made of an aluminum or aluminum alloy.

* * * * *